(12) United States Patent
Kawas et al.

(10) Patent No.: US 9,870,503 B2
(45) Date of Patent: Jan. 16, 2018

(54) VISUAL OBJECT AND EVENT DETECTION AND PREDICTION SYSTEM USING SACCADES

(71) Applicant: International Business Machines Corporation, Armonk, NY (US)

(72) Inventors: Ban Kawas, Irvington, NY (US);
Arvind Kumar, Chappaqua, NY (US);
Janusz Marecki, New York, NY (US);
Sharathchandra U. Pankanti, Darien, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 14/985,596

(22) Filed: Dec. 31, 2015

(65) Prior Publication Data
US 2017/0193294 A1 Jul. 6, 2017

(51) Int. Cl.
*G06K 9/00* (2006.01)
*G06K 9/62* (2006.01)
*G06T 7/20* (2017.01)

(52) U.S. Cl.
CPC ......... *G06K 9/00597* (2013.01); *G06K 9/628* (2013.01); *G06K 9/6218* (2013.01); *G06T 7/20* (2013.01); *G06T 2207/20021* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 6,061,086 A | * | 5/2000 | Reimer | G01N 21/8851 348/125 |
| 2010/0316287 A1 | * | 12/2010 | Duong | G06K 9/342 382/164 |
| 2014/0064609 A1 | * | 3/2014 | Petre | G06K 9/6232 382/159 |
| 2014/0307125 A1 | * | 10/2014 | Tanaka | G06K 9/2054 348/231.2 |
| 2017/0193325 A1 | * | 7/2017 | Duong | G06K 9/4671 |

OTHER PUBLICATIONS

Itti et al ("Computation modelling of visual attention", 2001).*
Keller et al., "Object Recognition Based on Human Saccadic Behaviour" Aug. 1999, Pattern Analysis & Applications, vol. 2, issue 3, pp. 251-263.

(Continued)

*Primary Examiner* — Avinash Yentrapati
(74) *Attorney, Agent, or Firm* — Yeen C. Tham; Otterstedt, Ellenbogen & Kammer, LLP (57) ABSTRACT

A method of operating an image detection device includes receiving an image, dividing the image into a plurality of patches, grouping ones of the plurality of patches, generating a set of saccadic paths through the plurality of patches of the image, generating a cluster-direction sequence for each saccadic path, generating a policy function for identifying an object in a new image using a combination of the cluster-direction sequences, and operating the image detection device using the policy function to identify an object in the new image.

15 Claims, 8 Drawing Sheets

(56) References Cited

OTHER PUBLICATIONS

Neskovic et al., "A Recognition System That Uses Saccades to Detect Cars from Real-Time Video Streams", Nov. 2002, 9th Int. Conf. on Neural Info. Proc., vol. 5, pp. 2162-2166.
Chernyak D.A. et al., "Sequential Knowledge-Driven Scene Recognition Model", Dec. 2001, Proc of 2001 IEEE Computer Society Conf on Computer Vision and Pattern Recognition, vol. 2, pp. 382-387.
Iwan Thomas, UK Intellectual Property Office, Search and Examination treport, UK Application GB1621726.7, Jun. 21, 2017, pp. 1-5.

* cited by examiner

DIGIT / SEQUENCE

| | 0 | 1 | 2 | 3 | 4 | 5 | 6 | 7 | 8 | 9 |
|---|---|---|---|---|---|---|---|---|---|---|
| | 0 | 0 | 0 | 0 | 4 | 3 | 0 | 0 | 0 | 35 |
| | 0 | 0 | 1 | 0 | 0 | 0 | 0 | 0 | 0 | 3 |
| | 0 | 0 | 3 | 0 | 0 | 0 | 0 | 0 | 0 | 3 |
| | 0 | 0 | 9 | 0 | 23 | 1 | 0 | 0 | 0 | 94 |
| | 2 | 0 | 9 | 39 | 35 | 38 | 2 | 1 | 57 | 122 |
| | 0 | 0 | 2 | 2 | 35 | 17 | 2 | 0 | 1 | 129 |
| NORMALIZED SUM | 0.0341 | 0.0447 | 0.0863 | 0.0357 | 0.1800 | 0.0686 | 0.0400 | 0.0676 | 0.0627 | 0.3804 |

VISUAL OBJECT AND EVENT DETECTION AND PREDICTION SYSTEM USING SACCADES

BACKGROUND

The present disclosure relates to machine vision, and more particularly to a computer vision system configured for saccadic vision.

Many machine learning approaches seek to recognize an object in an image by parallel processing of all pixels in the image. These methods can be computationally expensive.

BRIEF SUMMARY

According to an exemplary embodiment of the present invention, a method of operating an image detection device includes receiving an image, dividing the image into a plurality of patches, grouping ones of the plurality of patches, generating a set of saccadic paths through the plurality of patches of the image, generating a cluster-direction sequence for each saccadic path, generating a policy function for identifying an object in a new image using a combination of the cluster-direction sequences, and operating the image detection device using the policy function to identify an object in the new image.

According to an exemplary embodiment of the present invention, a method of operating an image detection device includes receiving an image, dividing the image into a plurality of patches, generating a cluster-direction sequence for each of a plurality of saccadic paths to be explored, wherein the plurality of saccadic paths are given by a policy matrix, and identifying an object in the image using the cluster-direction sequences.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

rapid identification of relevant objects, which depend on context, temporal following of one or more objects through a series of frames, as in a video, where the each frame is clearly related to the previous one, and lower energy, through only partial processing of an image.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, a policy for saccadic vision is developed, which is configured for recognizing an object. The goal of the policy is to provide guidance about the optimal direction to follow as successive parts of an image are uncovered to result in a high likelihood of identifying an object of interest.

According to an embodiment of the present invention, a computer vision system identifies an object in an image by starting at an initial position within the image and determining a path through the image, where the path is used to identify the identity of the object. According to an embodiment of the present invention, a context of the image can also be taken into account and can include previous observations as well as a goal for what is being sought. The computer vision system is configured for saccadic vision, having advantages including rapid identification of relevant objects, which depend on context, temporal following of one or more objects through a series of frames, as in a video, where the each frame is clearly related to the previous one, and lower energy, through only partial processing of an image.

Figure 1:
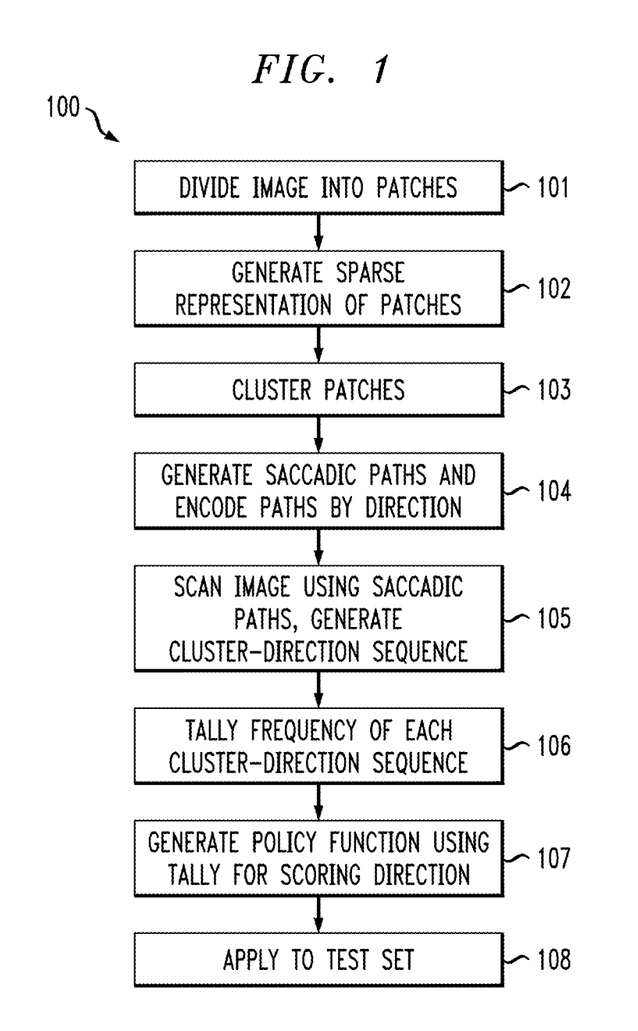
FIG. 1 is a flow diagram showing a method for training a policy function according to an exemplary embodiment of the present invention.
Figure 2:
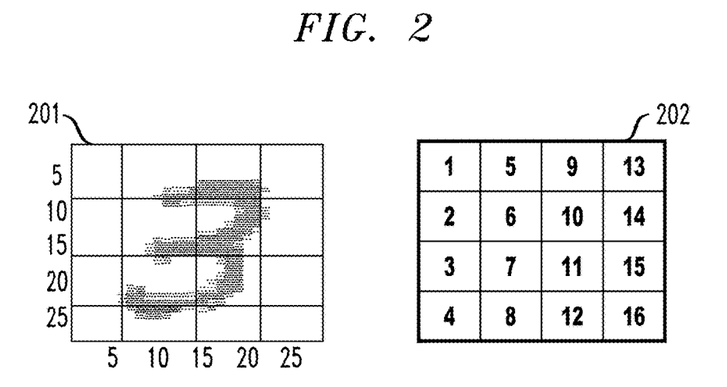
FIG. 2 shows a training image and patch map according to an exemplary embodiment of the present invention.

According to an exemplary embodiment of the present invention, a method for training a policy function 100 includes dividing each image in the training set into a number of smaller sub-images, referred to as patches 101. Patches may overlap with each other (not shown here for clarity). As shown in FIG. 2, image 201 is divided into 16 patches and corresponding patchIDs shown as 202.

In at least one embodiment of the present invention, different patches have different sizes. Patches can be different sizes in the sense that the same image can be processed at different resolutions, involving different-sized patches, or in the same image where, for example, a larger, center patch could be surrounded by smaller peripheral patches.

Figure 3:
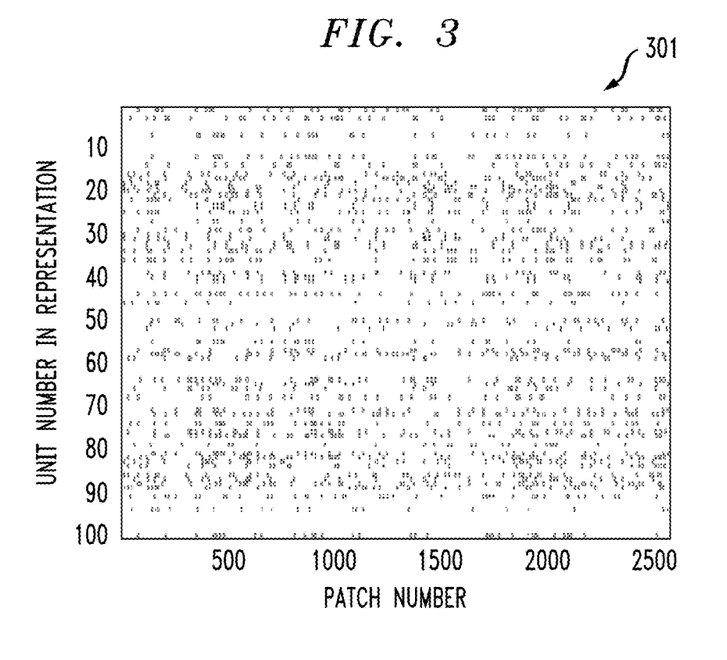
FIG. 3 shows an exemplary encoding of an image according to an exemplary embodiment of the present invention.

At block 102, a sparse representation of a large sampling of patches in the training set is generated. The sparse representation can be generated by a sparse auto-encoder. The representation includes units in a hidden layer, and have continuously varying values. For example, FIG. 3 shows an encoding 301 of the image of FIG. 2, which includes a 100-unit sparse representations for 2560 representative patches. In the encoding 301, white spots indicate higher values.

Figure 4:
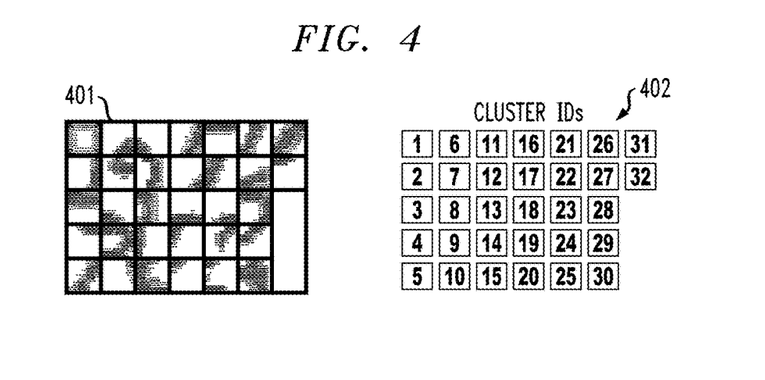
FIG. 4 shows a training image and cluster ID map according to an exemplary embodiment of the present invention.
Figure 5:
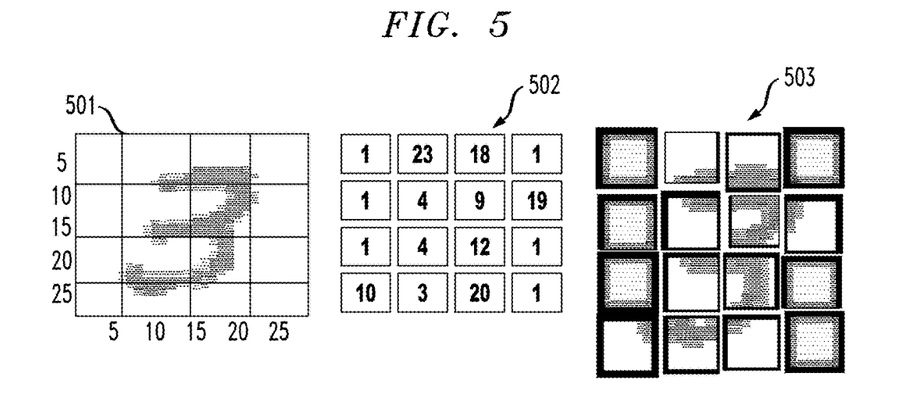
FIG. 5 shows a training image, cluster representation and reconstruction according to an exemplary embodiment of the present invention.

At block 103, the patches are clustered to group the patches into discrete clusters. According to an embodiment of the present invention, the clustering can be performed using a k-means clustering algorithm. In one example shown in FIG. 4 and FIG. 5, clusters are found by grouping the sparse representations into 32 clusters using k-means clustering and corresponding cluster IDs. Stated another way, FIG. 4 and FIG. 5 illustrate a micro-saccades policy. FIG. 4 shows cluster IDs 402 corresponding to certain clusters of the training image 401. FIG. 5 illustrates the training image 501, a cluster representation 502 and an exemplary reconstruction of the patches using the cluster representation 503.

Figure 6:
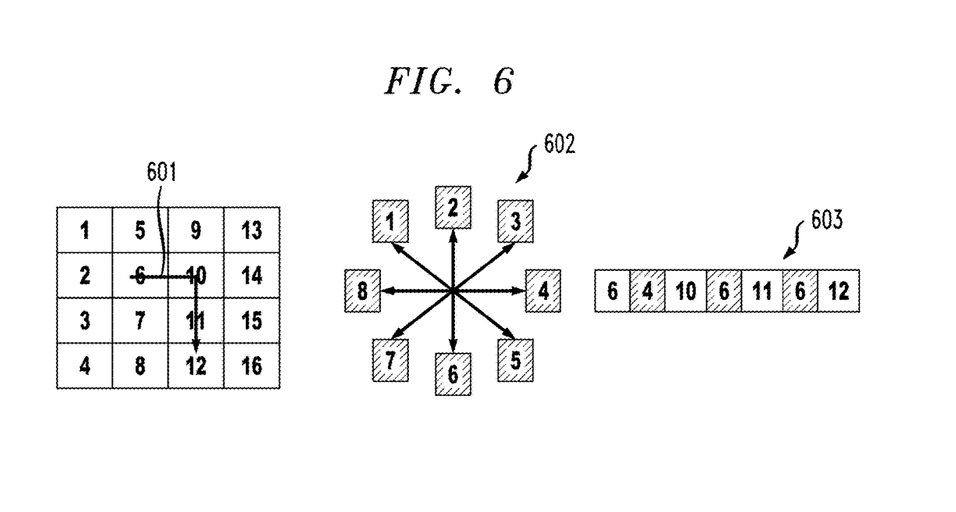
FIG. 6 shows an exemplary path, a direction encoding and saccadic path encoding according to an exemplary embodiment of the present invention.

At block 104, a set of saccadic paths are generated (see 601, FIG. 6) that can be applied to all images. This can be all possible paths in an image (e.g., feasible in a small image) or a subset of them (e.g., better suited for a large image). Each path is encoded in a format such as [(patchID 1) (direction 1) (patchID 2) (direction 2) (patchID 3) . . . (direction n) (patchID n+1)], where, for a saccade of n steps, patchID i is the location of the patch at step i, and direction i is the direction from patch i to patch i+1. Directions can be encoded, e.g., as shown as 602 where the up direction corresponds to "2," the right direction corresponds to "4," etc. Using the exemplary directional encoding of 602 to encode the path 601 yields a saccadic path encoding 603, including patchIDs 6, 10, 11 and 12, and directions 4, 6, and 6.

Figure 7:
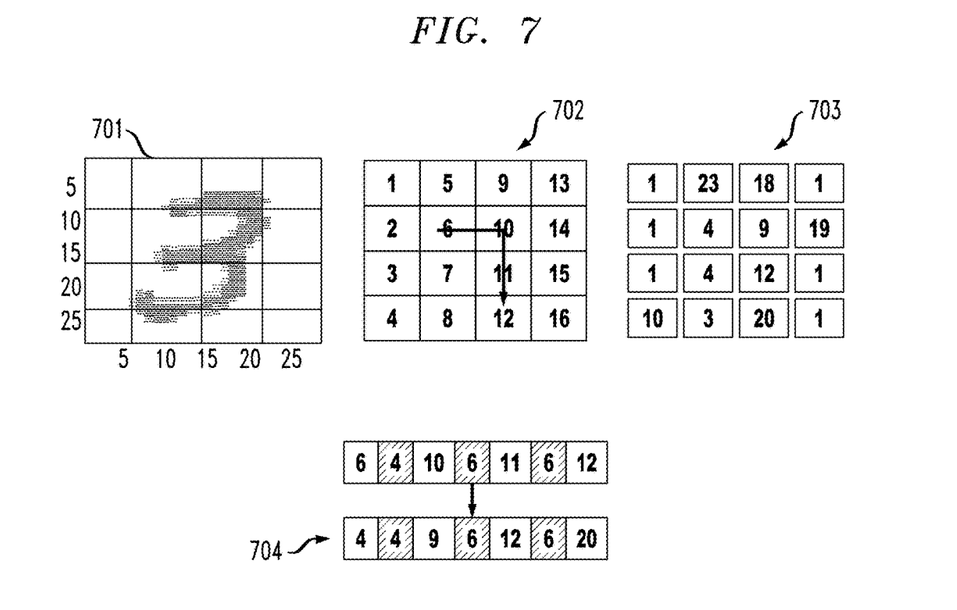
FIG. 7 shows a training image, an exemplary saccadic path, a cluster ID, saccadic path encoding and cluster sequence encoding according to an exemplary embodiment of the present invention.

At block 105, each image in the training set, e.g., 701, is scanned using each of the saccadic paths in the set. For each saccadic path, e.g., 702, create a sequence in which the patchID is replaced by the clusterID found in the image (see 703): [(clusterID 1) (direction 1) (clusterID 2) (direction 2) (clusterID 3) . . . (direction n) (clusterID n+1)], hereafter referred to as a cluster-direction sequence 704.

Figure 10:
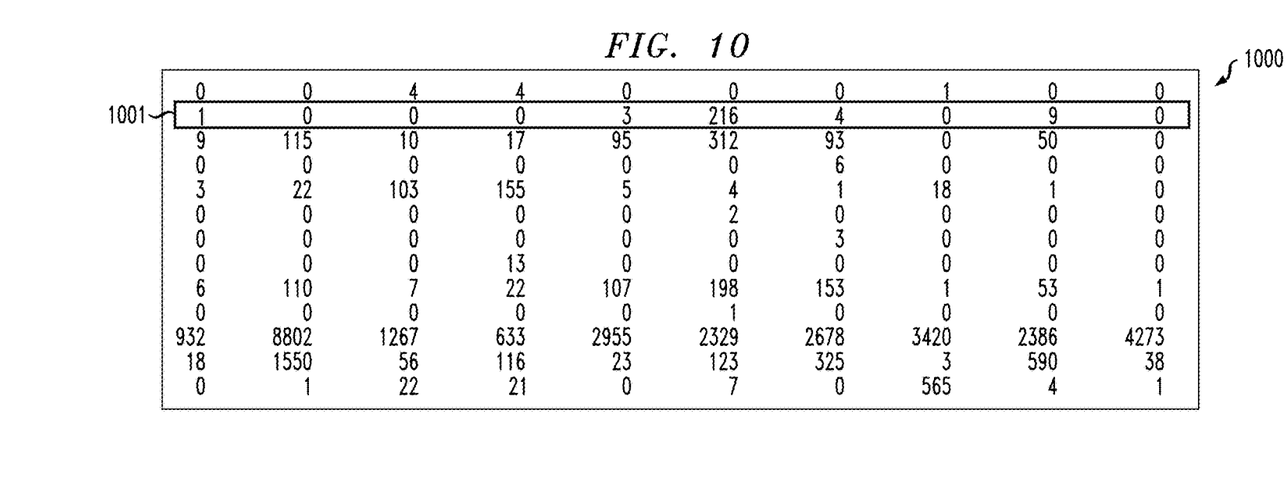
FIG. 10 is a sequence frequency table according to an exemplary embodiment of the present invention.

At block 106, for each such sequence, which may be labeled with a sequenceID, the system records and tallies the image label for which it was found. This process creates a table with each sequenceID and the frequency with which that sequence occurred for each image label, hereafter referred to as a sequence-frequency table (see e.g., table 1000, FIG. 10). The most salient sequences are those with high frequencies for only one or a small number of image labels. Examples of salient and non-salient sequences are shown in table 1000. The highlighted row 1001 shows a salient sequence, occurring far more frequently for digit 5 than for other digits.

According to an embodiment of the present invention, a sequenceID is associated with all the classes/objects for which that sequence has been encountered in the past. The frequency with which it's been seen with a particular class/object is given in the sequence-frequency table. A sequenceID can be associated with a unique class/object if that class/object is uniquely identifiable by that particular sequence.

At block 107, the sequence-frequency table is used to generate a policy function, stored as a policy matrix, which can guide the direction choice as successive patches are uncovered. The policy function is created by looking ahead to all cluster-direction sequences that start with a given cluster. For each such given cluster, the policy function explores each possible direction, and recursively follows it through every possible saccadic path starting with that cluster-direction combination. The policy function then computes a score for that direction by taking a frequency-weighted average of the likelihood of a correct identification for each sequence with that cluster-direction start. Since the policy matrix is generated recursively, scores for successive combinations of [clusterID-direction-clusterID . . . ] are also stored in the policy matrix, allowing the score to adjust as successive patches are uncovered and new information is obtained.

Figure 8:
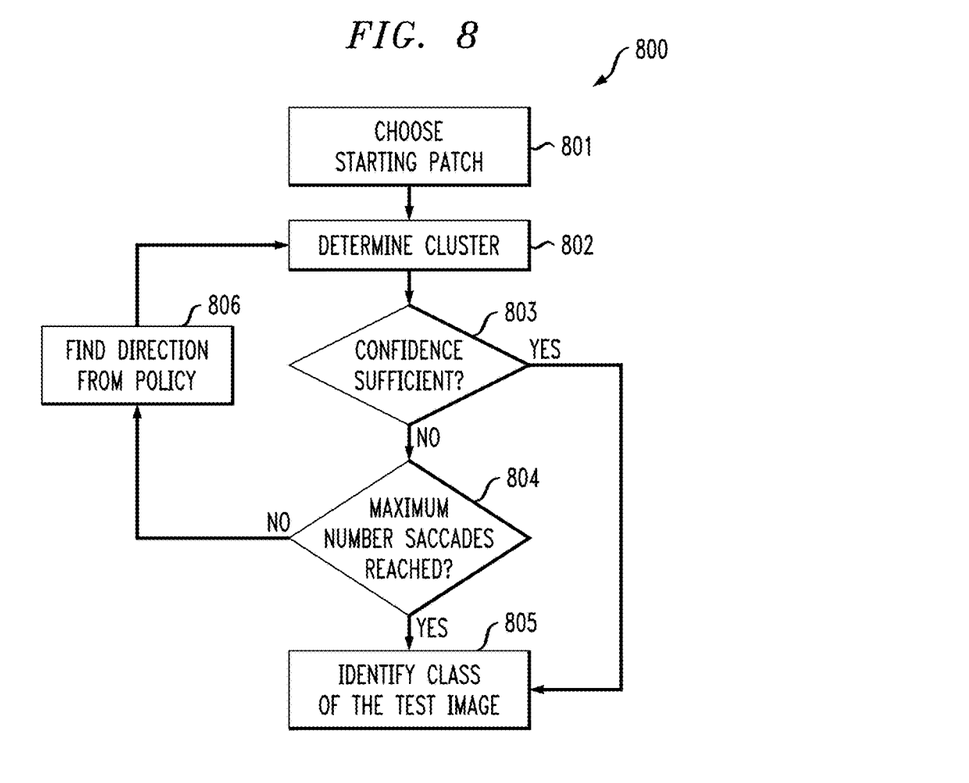
FIG. 8 is a flow diagram showing a method for analyzing an image using a policy function according to an exemplary embodiment of the present invention.

At block 108, a new image is presented in a test set (see flow 800, FIG. 8). According to an embodiment of the present invention, an initial patch in the test image is chosen 801 either at random, or using a known technique to identify a salient feature in the image. Starting at the chosen patch of the test image, neighboring groups of patches are iteratively selected. At block 802, the cluster to which the selected patch belongs is identified. At block 803, a confidence associated with a likelihood of correct identification or recognition of the test image is evaluated. As successive patches are selected, the new information attributable to the selected patches can be used as input into the policy matrix to generate a new or updated direction at 806. The direction refers to the patch to be selected next (see also, FIG. 6). Patches are successively selected until an acceptable likelihood of correct recognition is achieved (see block 803) or a maximum number of saccades has been reached (see block 804). At block 806, the policy matrix is used to generate the new or updated direction. Once the likelihood of correct recognition is achieved, or the maximum number of saccades has been reached, the system identifies an image class of the test image.

It should be understood that an identification of an image is associated with a confidence, and that the identification is made once the confidence meets a threshold confidence. The threshold confidence can be predetermined by a subject matter expert, set to a default, set during a training session, etc.

According to an embodiment of the present invention, the system has an online learning mode, in which the policy matrix adjusts its policy based on the outcome of each new observation it makes in the test set.

Figure 9:
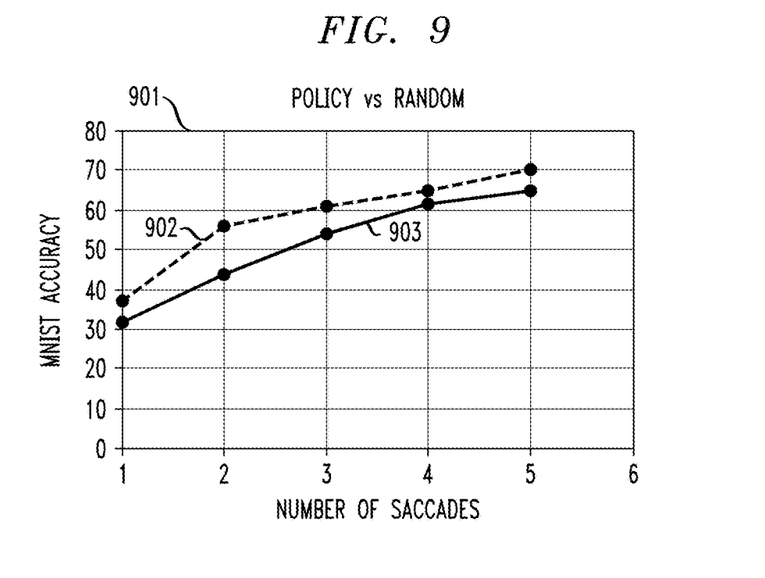
FIG. 9 is a graph of test set accuracy using a learned policy to guide saccadic path vs. a randomly chosen directional steps according to an exemplary embodiment of the present invention.
Figure 13:
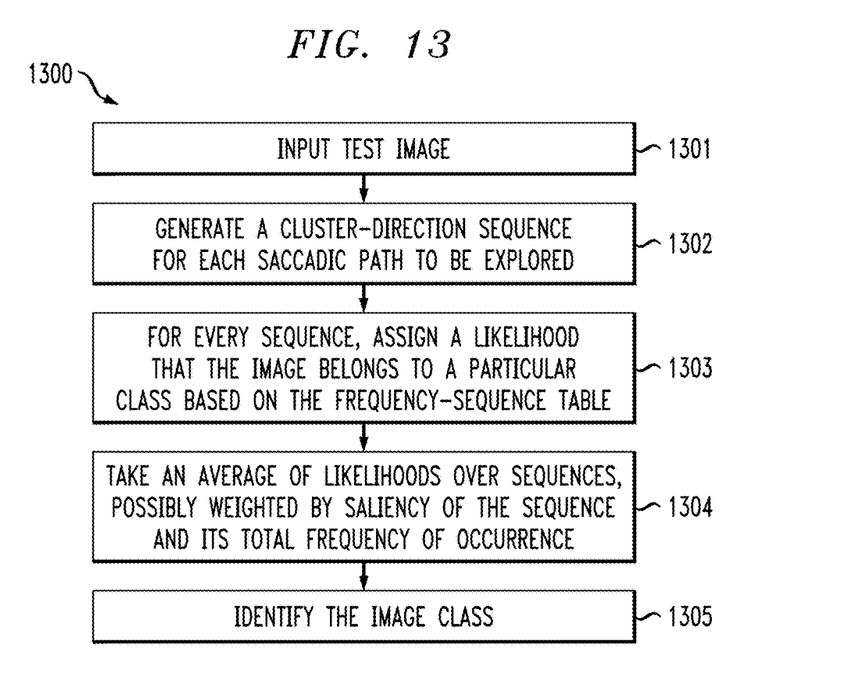
FIG. 13 is a flow diagram of a training method according to an embodiment of the present invention.

FIG. 9 is a graph 900 of test set accuracy using a learned policy to guide saccadic path (902) vs. a randomly chosen directional steps (903) according to an exemplary embodiment of the present invention According to one or more embodiments of the present invention, in a method of identifying an image (see FIG. 13), a computer system receives a new image in a test set at block 1301. A set of previously determined saccadic paths (e.g., those determining during training) is applied to the test image. For each saccadic path, the computer system creates a sequence in which the patchID is replaced by the clusterID found in the image at block 1302. For each sequence, the computer system retrieves the frequency with which the sequence occurred for each image in the training set using the sequence-frequency table at block 1303, discarding sequences which have not been encountered previously. For each sequence found, the computer system normalizes the frequencies to give a probability for each object in the recognition class, and takes an average of these probabilities at block 1304, possibly weighting each sequence by a factor which reflects the saliency of the sequence and its total frequency of occurrence. By combining information over a large number of saccades, the computer system identifies the image class of the received image at block 1305.

Figure 11:
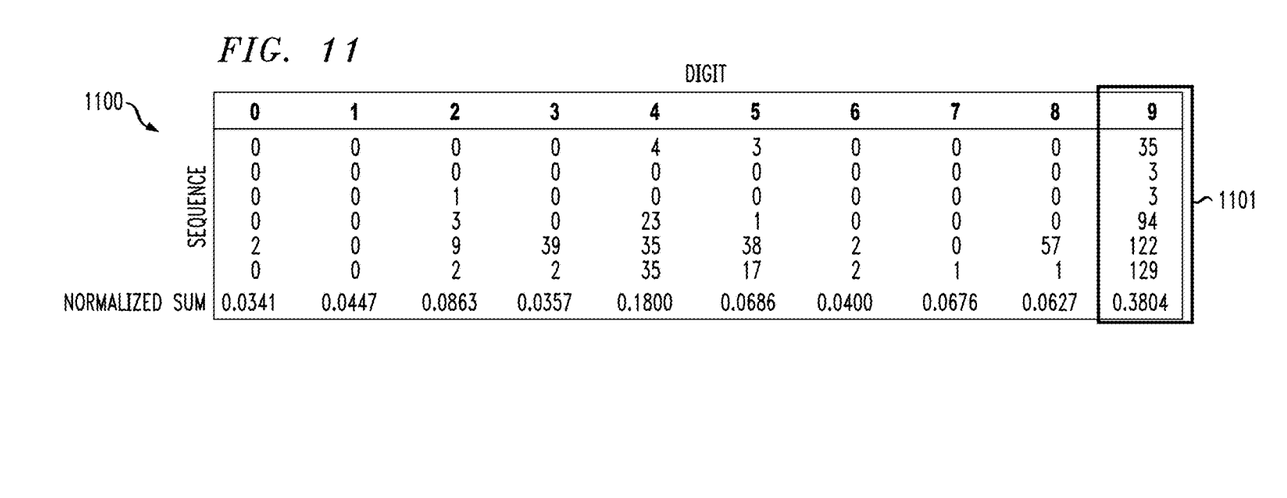
FIG. 11 is a sequence frequency table according to an exemplary embodiment of the present invention.
Figure 12:
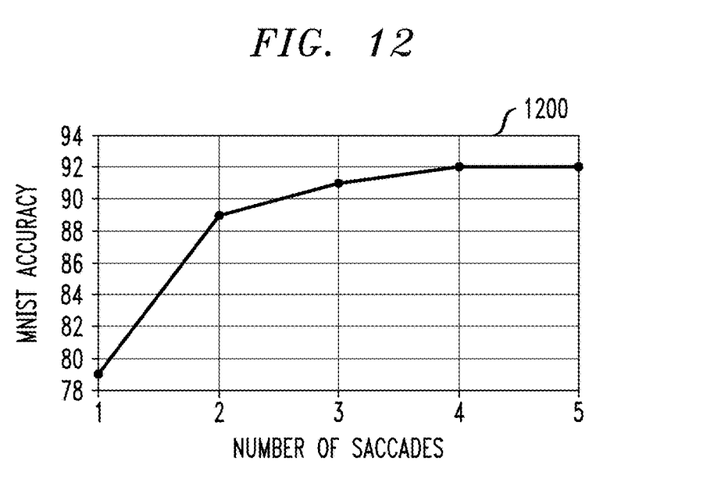
FIG. 12 is a graph of accuracy of a computer vision system on a test set according to an exemplary embodiment of the present invention.

Sample rows of sequence frequency table 1100 applied to a test image with label '9' (1101) and normalized sum over all rows is shown in FIG. 11, with the accuracy shown in FIG. 12, graph 1200.

Recapitulation

According to an embodiment of the present invention, a method determines identifying specific, salient features in an image which, when taken together, lead to a classification of the image by judging whether the set of salient feature can, with high probability, identify a unique class. The classification occurs through progressive exclusion of other classes. Examples of classes include the 9 MNIST digits (Mixed National Institute of Standards and Technology database of handwritten digits), or image classes in ImageNet (an image database organized according to the WordNet hierarchy), e.g., cats, dogs, planes, etc.

In one exemplary implementation, given an input image, a method opens a starting patch, and perceives that it is a kind of animal, but doesn't know with sufficient confidence which animal. The policy matrix guides the method to look toward the center of a certain portion of the image believed to include the head of the animal, which assists in excluding one or more types of animal (e.g., the method can exclude birds, but not a dog, cat, or horse). Based on the policy matrix, the method understands that a next distinguishing salient feature is the ears, and the method continues upwards to examine a portion of the image believed to include the ears. Given this additional information, the method recognizes with high confidence that the image is of a dog, but doesn't yet know what breed. The qualification to decide it's a dog involves consulting its policy matrix, which finds that the particular sequence being processed or "seen" has, in all past examples, been classified as a dog. Consulting again the policy matrix, the method knows where to look for finer features of a dog that can distinguish, within the class of dogs, between breads such as the German shepherd or a poodle. The classes can be at any level of granularity in the hierarchy—e.g., animal, dog, poodle, etc.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system having saccadic vision capabilities. Further, a computer program product can include a tangible computer-readable recordable storage medium with code adapted to be executed to carry out one or more method steps described herein, including the provision of the system with the distinct software modules.

Figure 14:
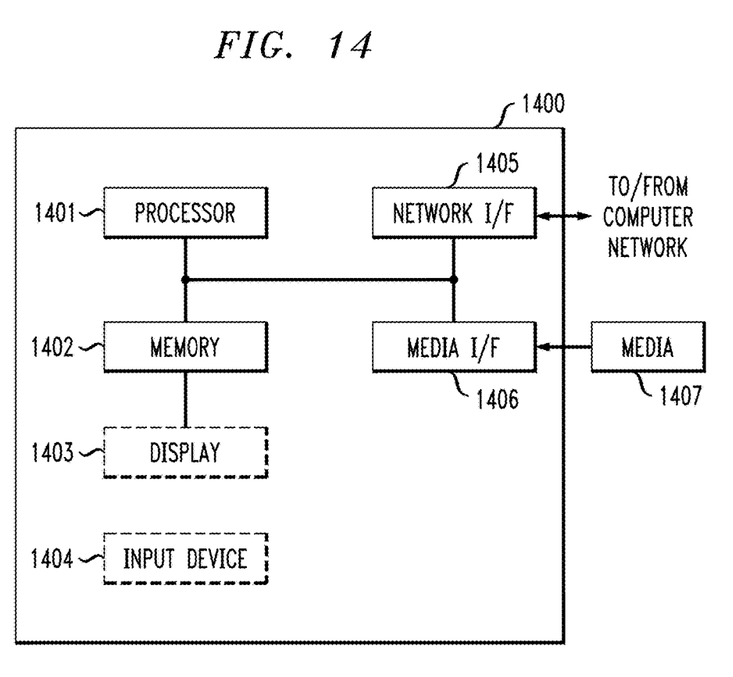
FIG. 14 is a block diagram depicting an exemplary computer system embodying a method for analyzing an image using a policy function according to an exemplary embodiment of the present invention.

Referring to FIG. 14; FIG. 14 is a block diagram depicting an exemplary computer system embodying the computer system having saccadic vision capabilities (see FIG. 1) according to an embodiment of the present invention. The computer system shown in FIG. 14 includes a processor 1401, memory 1402, display 1403, input device 1404 (e.g., keyboard), a network interface (I/F) 1405, a media I/F 1406, and media 1407, such as a signal source, e.g., camera, Hard Drive (HD), external memory device, etc.

In different applications, some of the components shown in FIG. 14 can be omitted. The whole system shown in FIG. 14 is controlled by computer readable instructions, which are generally stored in the media 1407. The software can be downloaded from a network (not shown in the figures), stored in the media 1407. Alternatively, software downloaded from a network can be loaded into the memory 1402 and executed by the processor 1401 so as to complete the function determined by the software.

The processor 1401 may be configured to perform one or more methodologies described in the present disclosure, illustrative embodiments of which are shown in the above figures and described herein. Embodiments of the present invention can be implemented as a routine that is stored in memory 1402 and executed by the processor 1401 to process the signal from the media 1407. As such, the computer system is a general-purpose computer system that becomes a specific purpose computer system when executing routines of the present disclosure.

Although the computer system described in FIG. 14 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating an image detection device comprising:
   receiving an image;
   dividing the image into a plurality of patches;
   grouping ones of the plurality of patches;
   generating a set of saccadic paths through the plurality of patches of the image;
   generating a cluster-direction sequence for each saccadic path;
   generating a policy function for identifying an object in a new image using a combination of the cluster-direction sequences; and
   operating the image detection device using the policy function to identify an object in the new image.

2. The method of claim 1, further comprising generating a sparse representation of the plurality of patches prior to performing the grouping.

3. The method of claim 1, further comprising generating the combination of the cluster-direction sequences.

4. The method of claim 3, further comprising:
   instantiating a sequence-frequency table; and
   populating the sequence-frequency table with the cluster-direction sequences, wherein the sequence-frequency table gives tallies for different sequences appearing in the cluster-direction sequences.

5. The method of claim 1, further comprising storing the policy function in a memory of the image detection device as a policy matrix for guiding a direction choice through patches of the new image.

6. A method of operating an image detection device comprising:
   receiving an image;
   dividing the image into a plurality of patches;
   generating a cluster-direction sequence for each of a plurality of saccadic paths to be explored, wherein the plurality of saccadic paths are given by a policy matrix; and
   identifying an object in the image using the cluster-direction sequences.

7. The method of claim 6, wherein generating the cluster-direction sequence for each of the plurality of saccadic paths to be explored further comprises:
   assigning a likelihood that the image belongs to each class defined by the policy matrix; and
   identifying the object in the image using an average of the likelihoods over the cluster-direction sequences.

8. The method of claim 7, further comprising weighting at least one of the likelihoods.

9. The method of claim 8, wherein the weighting uses a total frequency of the occurrence of the cluster-direction sequence in the policy matrix for a given class defined by the policy matrix.

10. The method of claim 6, further comprising pooling results from a plurality of saccades.

11. A computer program product for operating an image detection device, the computer program product comprising a computer readable storage medium having program instructions embodied therewith, the program instructions executable by a processor to cause the processor to:
    receive an image;
    divide the image into a plurality of patches;
    group ones of the plurality of patches;
    generate a set of saccadic paths through the plurality of patches of the image;
    generate a cluster-direction sequence for each saccadic path;
    generate a policy function for identifying an object in a new image using a combination of the cluster-direction sequences; and
    operate the image detection device using the policy function to identify an object in the new image.

12. The computer program product of claim 11, further comprising program instructions executable by the processor to cause the processor to generate a sparse representation of the plurality of patches prior to performing the grouping.

13. The computer program product of claim 11, further comprising program instructions executable by the processor to cause the processor to generate the combination of the cluster-direction sequences.

14. The computer program product of claim 13, further comprising program instructions executable by the processor to cause the processor to:
    instantiate a sequence-frequency table; and
    populate the sequence-frequency table with the cluster-direction sequences, wherein the sequence-frequency table gives tallies for different sequences appearing in the cluster-direction sequences.

15. The computer program product of claim 11, further comprising program instructions executable by the processor to cause the processor to store the policy function in a memory of the image detection device as a policy matrix for guiding a direction choice through patches of the new image.

* * * * *